(12) United States Patent
Kumar et al.

(10) Patent No.: US 8,569,913 B2
(45) Date of Patent: Oct. 29, 2013

(54) SWITCHABLE CAPACITOR ARRAYS FOR PREVENTING POWER INTERRUPTIONS AND EXTENDING BACKUP POWER LIFE

(75) Inventors: Santosh Kumar, Santa Clara, CA (US); Hanjoo Na, Fremont, CA (US)

(73) Assignee: Unigen Corporation, Fremont, CA (US)

( * ) Notice: Subject to any disclaimer, the term of this patent is extended or adjusted under 35 U.S.C. 154(b) by 0 days.

(21) Appl. No.: 13/531,359

(22) Filed: Jun. 22, 2012

(65) Prior Publication Data
US 2012/0293012 A1 Nov. 22, 2012

Related U.S. Application Data

(63) Continuation of application No. 13/108,950, filed on May 16, 2011, now Pat. No. 8,310,098.

(51) Int. Cl.
*H02J 7/00* (2006.01)
*H02J 9/00* (2006.01)

(52) U.S. Cl.
USPC .............................................. 307/66; 307/109

(58) Field of Classification Search
USPC .................................................... 307/66, 109
See application file for complete search history.

(56) References Cited

U.S. PATENT DOCUMENTS

| | | |
|---|---|---|
| 4,710,680 A | 12/1987 | Nakatani et al. |
| 4,994,896 A | 2/1991 | Uemura et al. |
| 5,127,447 A | 7/1992 | Furudate et al. |
| 5,151,559 A | 9/1992 | Conru et al. |
| 5,227,664 A | 7/1993 | Toshio et al. |
| 5,303,120 A | 4/1994 | Michii et al. |
| 5,309,020 A | 5/1994 | Murasawa et al. |
| 5,387,762 A | 2/1995 | Hasegawa et al. |
| 5,446,623 A | 8/1995 | Kanetake |
| 5,451,716 A | 9/1995 | Hasegawa et al. |
| 5,679,978 A | 10/1997 | Kawahara et al. |
| 5,742,097 A | 4/1998 | Matsunaga et al. |
| 5,754,408 A | 5/1998 | Derouiche |
| RE36,077 E | 2/1999 | Michii et al. |

(Continued)

FOREIGN PATENT DOCUMENTS

| | | |
|---|---|---|
| JP | 61069159 | 4/1986 |
| JP | 02071551 | 3/1990 |

(Continued)

OTHER PUBLICATIONS

Office Action, Mailing Date Oct. 17, 2011, U.S. Appl. No. 13/108,950, filed May 16, 2011.

(Continued)

*Primary Examiner* — Carlos Amaya
(74) *Attorney, Agent, or Firm* — Carr & Ferrell LLP (57) ABSTRACT

A technique for preventing power interruptions and extending backup power life is provided. The technique automatically prevents power interruptions in a line between a power source and a load. The technique can also extend the operating life of the power source. In one embodiment, a circuit for preventing power interruptions is provided. The circuit may include at least one arrays of capacitors, with the capacitors being arranged in parallel within an array, at least one switching elements configured to couple the at least one array of capacitors to a load, and a controller operatively coupled to the at least one switching element. The controller is configured to selectively drive the at least one switching element based on predetermined criteria.

12 Claims, 6 Drawing Sheets

(56) References Cited

U.S. PATENT DOCUMENTS

| | | | |
|---|---|---|---|
| 6,021,670 | A | 2/2000 | Takeuchi |
| 6,189,203 | B1 | 2/2001 | Heinrich et al. |
| 6,445,064 | B1 | 9/2002 | Ishii et al. |
| 6,458,617 | B1 | 10/2002 | Liao et al. |
| 6,588,132 | B2 | 7/2003 | Tsuji |
| 6,607,937 | B1 | 8/2003 | Corisis |
| 6,670,701 | B2 | 12/2003 | Matsuura et al. |
| 6,737,738 | B2 | 5/2004 | Koh et al. |
| 6,777,798 | B2 | 8/2004 | Fukumoto et al. |
| 6,798,056 | B2 | 9/2004 | Matsuura et al. |
| 6,844,616 | B2 | 1/2005 | Liao et al. |
| 7,180,166 | B2 | 2/2007 | Ho et al. |
| 7,235,871 | B2 | 6/2007 | Corisis |
| 7,247,934 | B2 | 7/2007 | Pu |
| 7,388,280 | B2 | 6/2008 | Shim et al. |
| 7,622,800 | B2 | 11/2009 | Ramakrishna et al. |
| 7,785,929 | B2 | 8/2010 | Camacho et al. |
| 7,804,280 | B2 * | 9/2010 | Deaver et al. .................. 323/210 |
| 7,855,444 | B2 | 12/2010 | Camacho et al. |
| 7,981,702 | B2 | 7/2011 | Ho et al. |
| 7,986,043 | B2 | 7/2011 | Merilo et al. |
| 8,067,827 | B2 | 11/2011 | Corisis |
| 8,310,098 | B2 | 11/2012 | Kumar et al. |
| 8,358,017 | B2 | 1/2013 | Tsui |
| 2002/0000056 | A1 | 1/2002 | Tsuji |
| 2002/0089048 | A1 | 7/2002 | Liao et al. |
| 2003/0127729 | A1 | 7/2003 | Fukumoto et al. |
| 2005/0253224 | A1 | 11/2005 | Ho et al. |
| 2006/0059396 | A1 | 3/2006 | Ohbayashi |
| 2006/0091516 | A1 | 5/2006 | Matsunami |
| 2006/0102994 | A1 | 5/2006 | Pu |
| 2006/0197205 | A1 | 9/2006 | Ramakrishna et al. |
| 2007/0228545 | A1 | 10/2007 | Ramakrishna et al. |
| 2008/0203552 | A1 | 8/2008 | Kim |
| 2009/0283919 | A1 | 11/2009 | Tsui |
| 2010/0295379 | A1 * | 11/2010 | Garcia .......................... 307/109 |
| 2011/0215654 | A1 | 9/2011 | Kumar et al. |
| 2012/0024064 | A1 * | 2/2012 | Wu et al. .................... 73/514.32 |
| 2013/0020695 | A1 | 1/2013 | Na et al. |

FOREIGN PATENT DOCUMENTS

| | | |
|---|---|---|
| JP | 04159762 | 6/1992 |
| JP | 04367256 | 12/1992 |
| JP | 07147368 | 6/1995 |
| KR | 2002002825 | 1/2002 |

OTHER PUBLICATIONS

Final Office Action, Mailing Date Mar. 14, 2012, U.S. Appl. No. 13/108,950, filed May 16, 2011.

Notice of Office Action, Mailing Date May 25, 2012, U.S. Appl. No. 13/108,950, filed May 16, 2011.

Office Action, Mailing Date Nov. 16, 2012, U.S. Appl. No. 13/187,380, filed Jul. 20, 2011.

Final Office Action, Mailing Date Apr. 18, 2013, U.S. Appl. No. 13/187,380, filed Jul. 20, 2011.

AA, Mailing Date May 28, 2013, U.S. Appl. No. 13/187,380, filed Jul. 20, 2011.

* cited by examiner

SWITCHABLE CAPACITOR ARRAYS FOR PREVENTING POWER INTERRUPTIONS AND EXTENDING BACKUP POWER LIFE

CROSS-REFERENCE TO RELATED APPLICATIONS

This application is a continuation and claims the priority benefit of U.S. patent application Ser. No. 13/108,950, filed on May 16, 2011 now U.S. Pat. No. 8,310,098, titled "Switchable Capacitor Arrays for Preventing Power Interruptions and Extending Backup Power Life," which is incorporated herein by reference in its entirety.

BACKGROUND

1. Field of the Invention

The present invention relates generally to power supply systems controls, and more specifically to circuits using switchable capacitor arrays to prevent errors due to power interruptions.

2. Description of Related Art

Electronic devices, systems, and their applications are continually developing and increasing in number. As the number and applications of electronic devices continues to increase, the demand for efficient and uninterrupted power supplies to drive these devices is also increasing. Power supplies used for supplying power to electronic devices comprise disposable and rechargeable batteries, alternating current (AC) power supplies, direct current (DC) power supplies, and so forth. All of these power sources may suffer from power interruptions, voltage/energy drops, and the like. Commonly, capacitors, capacitor arrays, and supercapacitors are used as "power cache" devices to compensate for the shortcomings of power sources.

Typically, capacitors used as a power cache are installed in parallel to a power source so that they can provide current boost for high load demands. In one of the most common applications, capacitors/supercapacitors are placed in a supply line and provide power to supply an electronic device in the absence of power from the main power source. In another example, the power demand level of an electronic device may be suddenly increased, and the installed capacitors can supply power to satisfy the increased power demand. This arrangement functions because there is little resistance in the capacitor/supercapacitor as compared to the power source.

However, the use of capacitors and supercapacitors as a power supply in an increased power demand situation may be less than optimal due to the inflexible nature of capacitors and supercapacitors. For example, power consumption in an electronic device may not be uniform throughout the device when the power demand is suddenly increased. In such a situation, a capacitor may not supply enough power to address the sudden increase in the power consumption of the device. Furthermore, when the capacitors cannot adequately compensate for power load peaks, the battery lifetime may be significantly decreased.

SUMMARY OF THE CLAIMED INVENTION

Various embodiments of the invention relate to a technique for preventing power interruptions. This technique can automatically prevent power interruptions in the line between a power source and a load. The technique can also extend the operating life of the power source.

In various embodiments of the invention, a circuit for preventing power interruptions is provided. The circuit may include at least one array of capacitors, with the capacitors arranged in parallel within an array, at least one switching element configured to couple the at least one array of capacitors to a load, and a controller operatively coupled to the at least one switching element. The controller is configured to selectively drive the at least one switching element based on predetermined criteria.

The controller may further include a timer. The predetermined criteria may include a designated time period so that when the time period expires, the at least one switching element is triggered. The at least one array of capacitors may further include additional switching elements configured to couple at least one capacitor within the arrays. The circuit may include a current limiter. The circuit may include a voltage regulator. The circuit may include at least one fuse deployed between the at least one array of capacitors and the corresponding switching element.

The circuit may further include a power monitor deployed between the at least one array of capacitors and the load. The power monitor may be coupled to the controller. The power monitor may be configured to measure the current passing through it. The controller may be configured to selectively drive the at least one switching element based on parameters measured by the power monitor. The controller may be configured to switch the at least one switching element when the difference in voltage between a corresponding array of capacitors and the load is higher than a predetermined level. The circuit may be configured to be coupled to the load, wherein the load is at least a part of an electronic device. The circuit may further include a power source.

According to other embodiments, a circuit for providing power to a load is provided. The circuit includes a power source communicatively coupled with the load. The circuit includes at least one array of capacitors, with the capacitors being arranged in parallel within an array. The at least one array of capacitors are coupled to the power source. The circuit may further include at least one switching element configured to couple the at least one arrays of capacitors to the load and a controller operatively coupled to the at least one switching elements. The controller may be configured to selectively drive the at least one switching element based on predetermined criteria.

The controller may include a timer. The predetermined criteria may include a designated time period so that when the time period expires, the at least one switching element is triggered. The circuit may further include a current limiter and a voltage regulator. The circuit may further include at least one fuse deployed between the at least one array of capacitors and the corresponding switching elements. The circuit may further include a power monitor deployed between the at least one array of capacitors and the load. The power monitor may be communicatively coupled with the controller. The power monitor may be configured to measure the current passing through it.

The controller may be configured to selectively drive the at least one switching element based on parameters measured by the power monitor. The controller is configured to switch on the at least one switching element when the voltage measured between the corresponding array of capacitors and a load is higher than a predetermined level. The circuit may be configured to be communicatively coupled with the load, with the load being at least a part of an electronic device.

BRIEF DESCRIPTION OF THE DRAWINGS

Embodiments are illustrated by way of example and not limitation in the figures of the accompanying drawings, in which like references indicate similar elements.

DETAILED DESCRIPTION

The following detailed description includes references to the accompanying drawings, which form a part of the detailed description. The drawings show illustrations in accordance with exemplary embodiments. These exemplary embodiments, which are also referred to herein as "examples," are described in detail to enable those skilled in the art to practice the present subject matter. The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The embodiments described herein relate to a device for preventing interruptions in power supply from a power source to an electrical load. As used herein, the term "power source" relates to any device that supplies electrical energy to at least one electric load. The power source may include one or more of the following: disposable and rechargeable batteries, DC power supplies, AC power supplies, fuel cells, solar power sources, mechanical power sources, chemical power sources, power generators, hybrid power sources, and so forth. The power source can be either internal or external to an electrical system.

Capacitors that are electrically connected in circuits degrade over time. This degradation can lead to the backup power supply being inadequate for the purposes of the circuit. To compensate, additional capacitors may be installed but not actively connected to the circuit. The additional capacitors may be selectively activated, and de-activated, via a switching element. The switching decision may be made by monitoring various circuit parameters, or by setting pre-determined thresholds.

The term "load," as used herein, refers to any electrical device consuming electrical power. Particular examples of the load include electrical components, circuits, computers, computer components (such as memory), cell phones, radio transmitters, and so forth.

The present invention discloses various mechanisms by which additional power storage and/or supply may be selectively added to a circuit. The circuit may sense a predetermined parameter, such as a high current due to shorted components such as a capacitor or capacitors, and isolate the corresponding components from the power rail (the portion of the circuit between the power source and the load). In this case, the switching element may be irreversible, such as a fuse.

Circuits according to the present invention may provide a mechanism whereby a device or circuit may be properly shut down in the event of a power interruption. The circuit may provide backup power so that the circuit shuts down gracefully to avoid any errors such as data loss or corruption.

Circuits according to the present invention may also include temporary switching elements. The circuit may include a controller that senses parameters such as voltage, current, and/or time, and controls switching element(s) to isolate or to add (couple) electrically one or more arrays or portions of arrays of capacitors.

Figure 1:
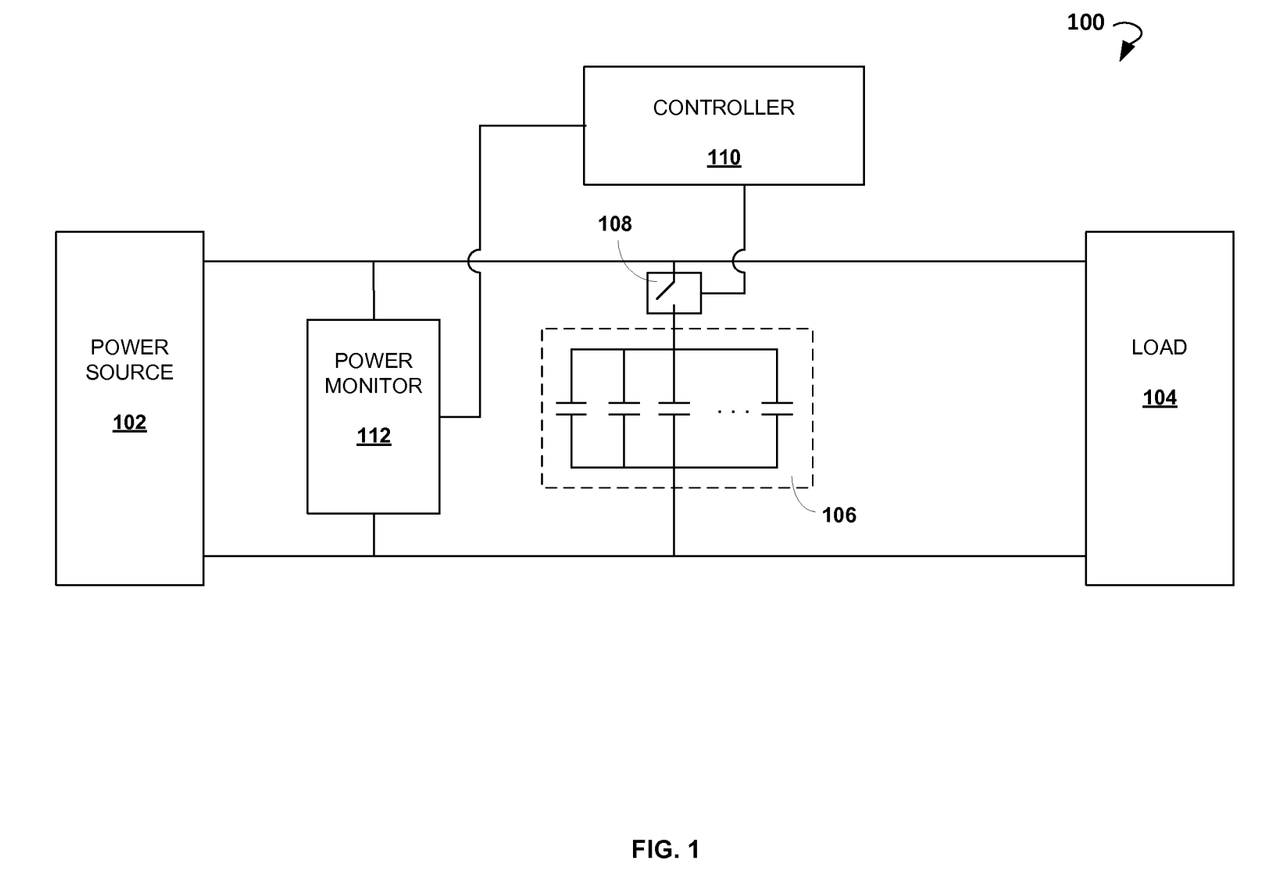
FIG. 1 is a block diagram illustrating an electronic system with a circuit for preventing power interruptions.

Referring now to the drawings, FIG. 1 is a block diagram illustrating an electronic system 100 that utilizes a circuit to prevent power interruptions. As shown in FIG. 1, a power source 102 may be coupled to a load 104 through a capacitor array 106. The line coupling the input power source and the load is called the input power rail.

The capacitor array 106 includes a plurality of capacitors coupled in parallel and connected to the power rail between the power source 102 and the load 104. The capacitor array 106 may include only one capacitor, or, alternatively, may include a plurality of capacitors. In this patent, the capacitor array 106 may also include a supercapacitor or an array of supercapacitors. As used herein, the term "capacitor" refers to a device for storing an electric charge. The term "supercapacitor" may refer to, e.g. a capacitor, an electric double-layer capacitor (EDLC), a supercondenser, an electrochemical double layer capacitor, or an ultracapacitor.

As shown in FIG. 1, the capacitor array 106 may be coupled to the line between the power source 102 and the load 104 via a switching element 108. The switching element 108 is an electrical, or electromechanical, component that can break an electrical circuit, thereby interrupting a current or diverting it from one conductor to another. One particular example of the switching element 108 is a relay. However, an integrated circuit may also be used to perform the switching function in some embodiments.

The switching element 108 may be operatively coupled with a controller 110. The controller 110 is configured to operate the switching element 108 based on predetermined criteria. In one example, the controller 110 triggers the switching element 108 when a predetermined time period has lapsed since the start of operation of the electronic system 100. For this purpose, the controller 110 may also include an external or internal timer.

The controller 110 may be any of a micro-controller, a processor, a microprocessor, and other electronic units designed to perform the described functions of the controller. The controller 110 may include a memory tangibly embodying instructions that can cause the controller 110 to implement its functions. The instructions may be written in a computer programming language or the instructions may be embodied in firmware logic.

The electronic system 100 may optionally include a power monitor 112 coupled to the line between the capacitor array 106 and the power source 102. The power monitor 112 is configured to monitor parameters of the electronic system 100 such as capacitance, supply voltage, voltage drain, and so forth, in real time (e.g., each 1 microsecond or the like). The power monitor 112 is also operatively coupled to the controller 110 to deliver measured parameters. The controller 110 and/or the power monitor 112 may be configured to analyze, evaluate, or process the measured parameters.

The predetermined criteria to drive the capacitor array 106 may be based on the measured parameters. For example, the power monitor 112 may measure a supply voltage/energy drop. The controller 110 may then determine whether the voltage/energy drop is equal to or greater than a predetermined level. If so, the controller 110 activates the switching element 108 to couple the capacitor array 106 to the line between the power source 102 and the load 104. In this case, the previously charged capacitors then discharge to compensate for the measured voltage/energy drop, thereby charging the power source 102 to compensate for the voltage/energy drop. As soon as the supply voltage returns to a predetermined normal level, the capacitor array 106 may be recharged and decoupled from the line by the switching element 108.

According to various embodiments, the power monitor 112 and the controller 110 may be integrated into a single device. Moreover, the electronic system 100 may further include additional monitors to measure different electrical parameters. The exact configuration of the electronic system 100 and the parameters measured may depend on the characteristics of a given application.

Figure 2:
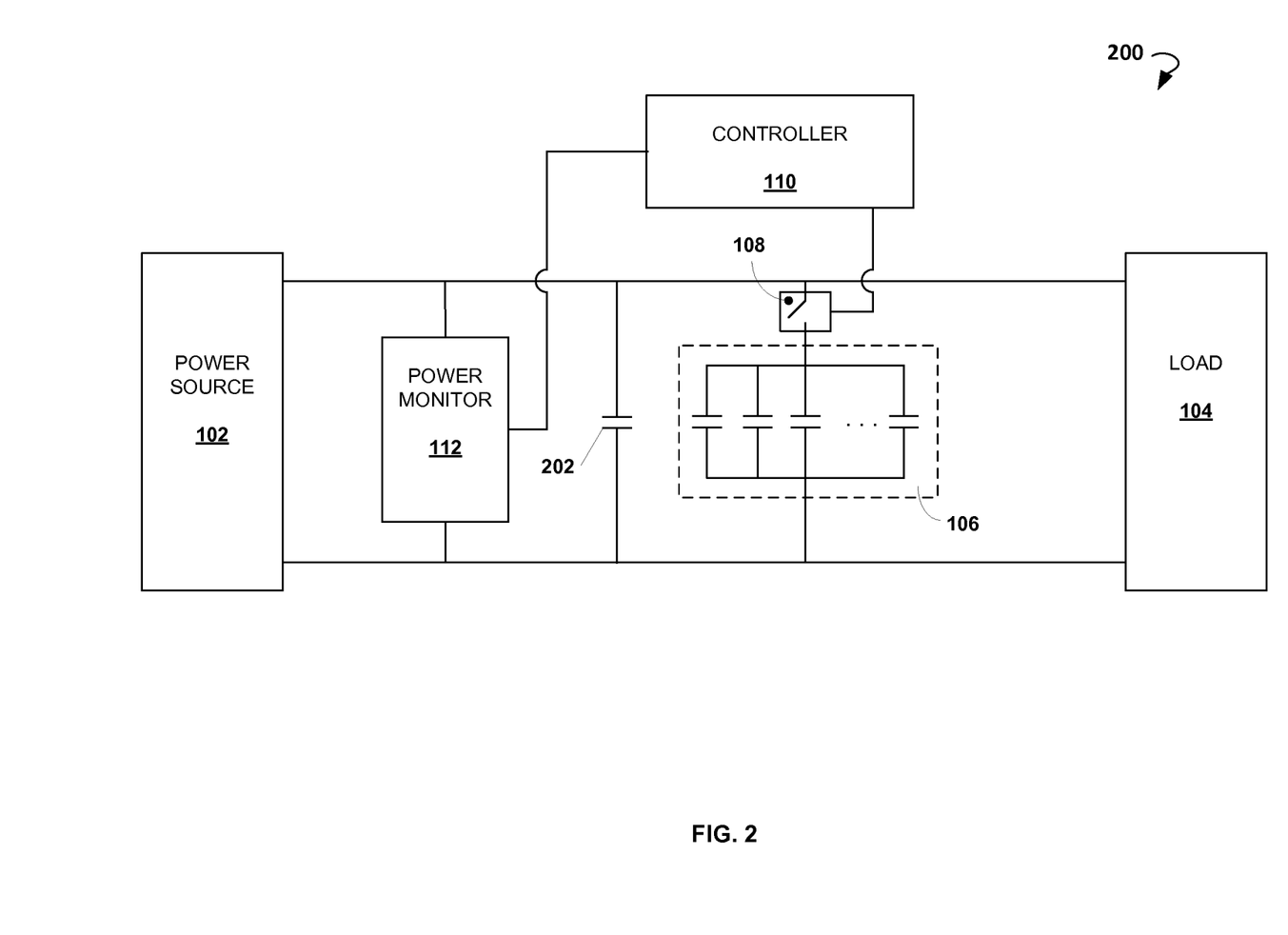
FIG. 2 is a block diagram illustrating an electronic system with a circuit for preventing power interruptions.

FIG. 2 is a block diagram illustrating an electronic system 200, in which a circuit for preventing power interruptions is used, according to another exemplary embodiment. The electronic system 200 includes the power source 102, the load 104, the capacitor array 106, the switching element 108, the controller 110, and the power monitor 112. The electronic system 200 further includes an additional capacitor array 202, which is coupled to the line between the power source 102 and the load 104. The additional capacitor array 202 may include a single capacitor or a plurality of capacitors connected to each other in parallel. The additional capacitor array 202 may also be a supercapacitor or an array of supercapacitors.

According to the embodiment illustrated in FIG. 2, the power monitor 112 measures the capacitance of the additional capacitor array 202 in real time. In the event of a voltage/energy drop exceeding a predetermined value, the additional capacitor array 202 may be discharged to compensate for the voltage/energy drop. During this event, the total capacitance of the additional capacitor array 202 may fall below the capacitance level required to provide the compensatory current boost. If it does, the controller 110, based on the real time measurement of the capacitance, may activate the switching element 108 to couple the capacitor array 106 to the circuit to assist in the compensation for the voltage/energy drop.

Figure 3:
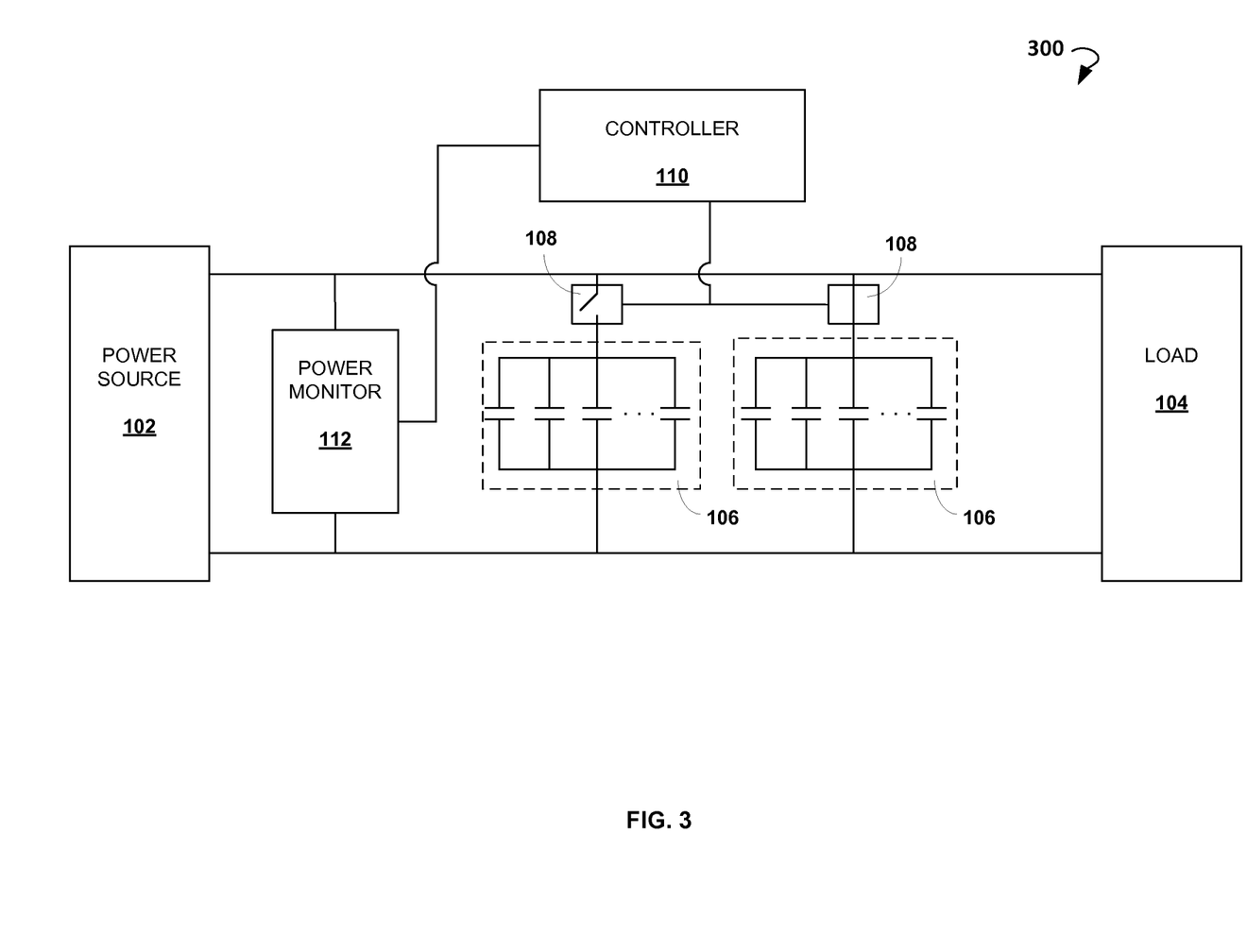
FIG. 3 is a block diagram illustrating an electronic system with a circuit for preventing power interruptions.

According to another embodiment, a plurality of capacitor arrays 106 may be employed to compensate for the voltage/energy drop. An exemplary embodiment utilizing a plurality of capacitor arrays 106 is shown in FIG. 3, which illustrates a block diagram of an electronic system 300. The electronic system 300 includes the power source 102, the load 104, the controller 110, and the power monitor 112. The electronic system 300 further includes a plurality of the capacitor arrays 106, which are coupled to the line between the power source 102 and the load 104. The electronic system 300 further includes a plurality of the switching elements 108 coupled with the power rail, the line between the power source 102 and the corresponding capacitor arrays 106. Accordingly, each capacitor array 106 may be provided with a corresponding switching element 108. Alternatively, some capacitor arrays 106 may be coupled with the power rail without a dedicated switching element 108.

The power monitor 112 may perform the real time measurement of the capacitance of the capacitor arrays 106 when they are coupled to the power rail between the power source 102 and the load 104. The measured capacitance is transmitted to the controller 110 for analysis. If the measured capacitance falls below a first predetermined level, the controller 110 instructs the switching element 108 to activate an additional capacitor array 106. If the measured capacitance falls below a second predetermined level, the controller 110 instructs the switching element 108, or a second switching element 108, to activate at least one additional capacitor array 106. Those skilled in the art will understand that multiple implementations utilizing various combinations of switching elements, capacitors, and capacitor arrays are possible.

Figure 4:
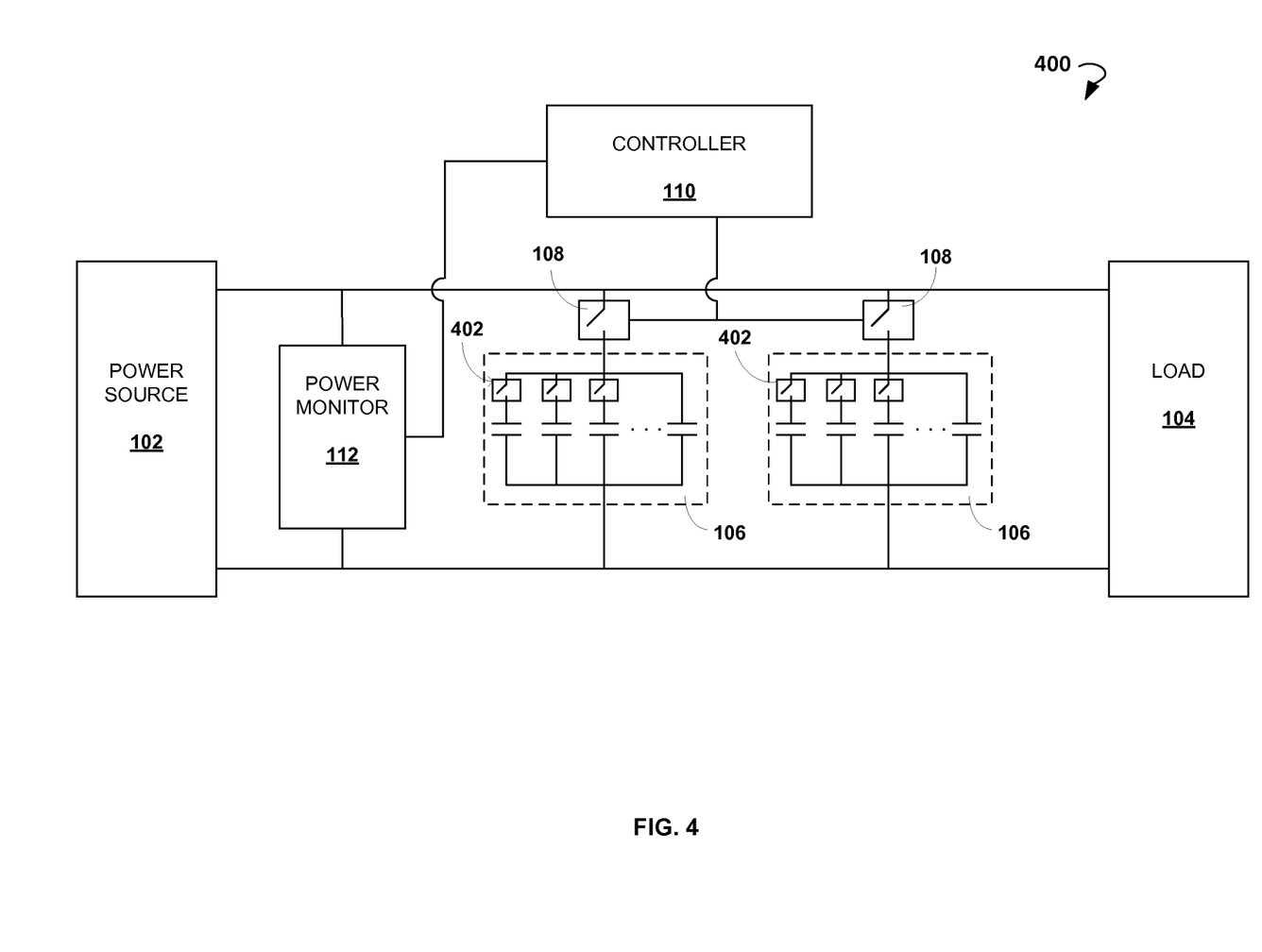
FIG. 4 is a block diagram illustrating an electronic system with a circuit for preventing power interruptions.

FIG. 4 illustrates another exemplary embodiment of an electronic system 400 in which a circuit for preventing power interruptions is implemented. As with various embodiments described above, the electronic system 400 includes the power source 102, the load 104, the controller 110, the power monitor 112, the at least one capacitor array 106 (two are illustrated in FIG. 4), and the at least one switching element 108. In FIG. 4, the circuit is illustrated as having a dedicated switching element for each capacitor array 106. The electronic system 400 further includes several additional switching elements 402, which are disposed within the capacitor array 106 and are associated with at least one capacitor of the capacitor array 106. This configuration may provide for selective activation of any desired combination of capacitors in the capacitor arrays 106. The controller 110 may be configured to drive both switching elements 108 and additional switching elements 402 in various combinations.

Figure 5:
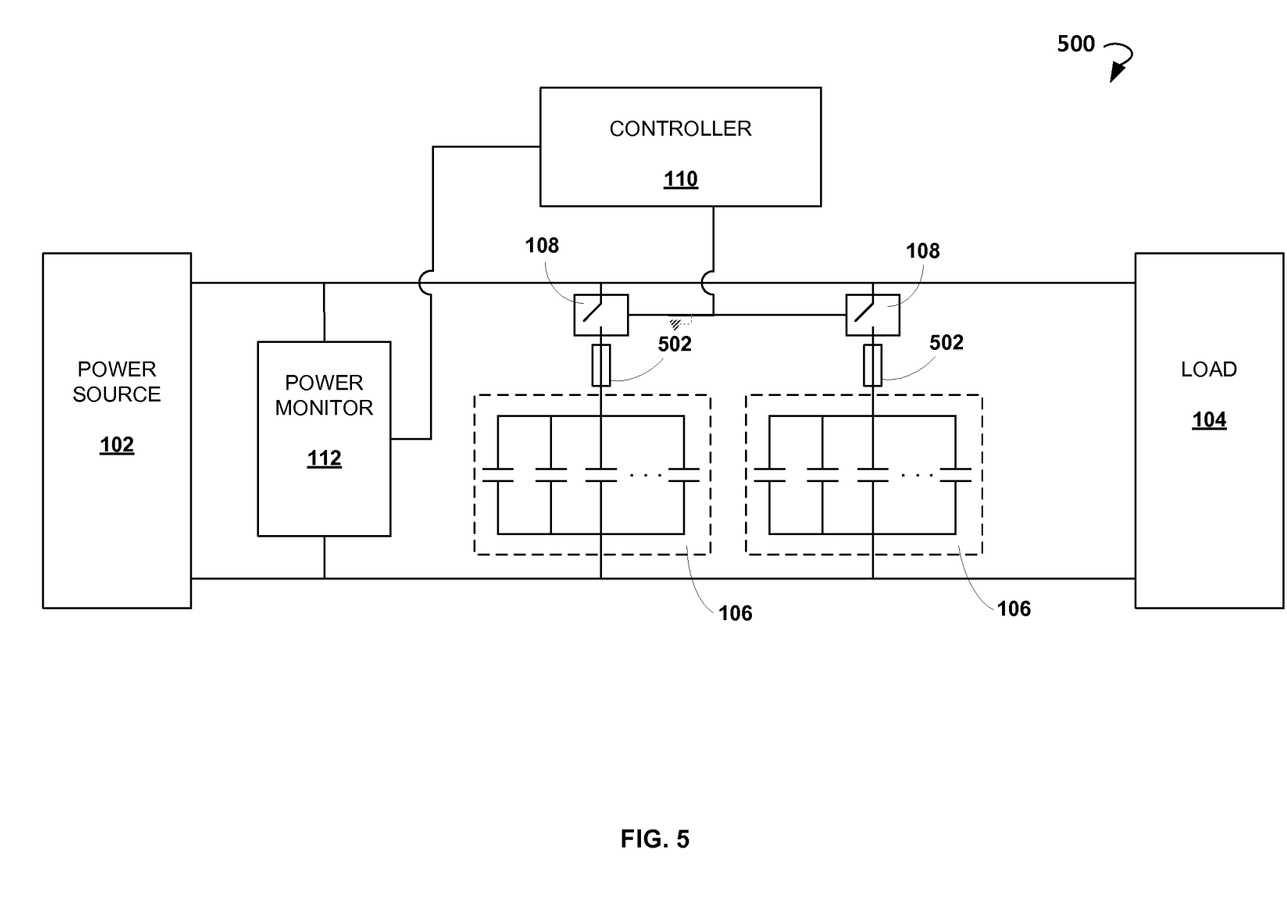
FIG. 5 is a block diagram illustrating an electronic system with a circuit for preventing power interruptions.

FIG. 5 illustrates yet another one exemplary embodiment of an electronic system 500 in which a circuit for preventing power interruptions is implemented. The electronic system 500 includes the power source 102, the load 104, the controller 110, the power monitor 112, the at least one capacitor array 106, and the at least one switching element 108. The electronic system 500 may also include a fuse 502 that communicatively couples at least one capacitor array 106 and at least one switching element 108. The fuse 502 may be considered an irreversible switching element. In the embodiment illustrated in FIG. 5, there are two capacitor arrays 106 and two fuses 502. However, any other number of components may be used.

Figure 6:
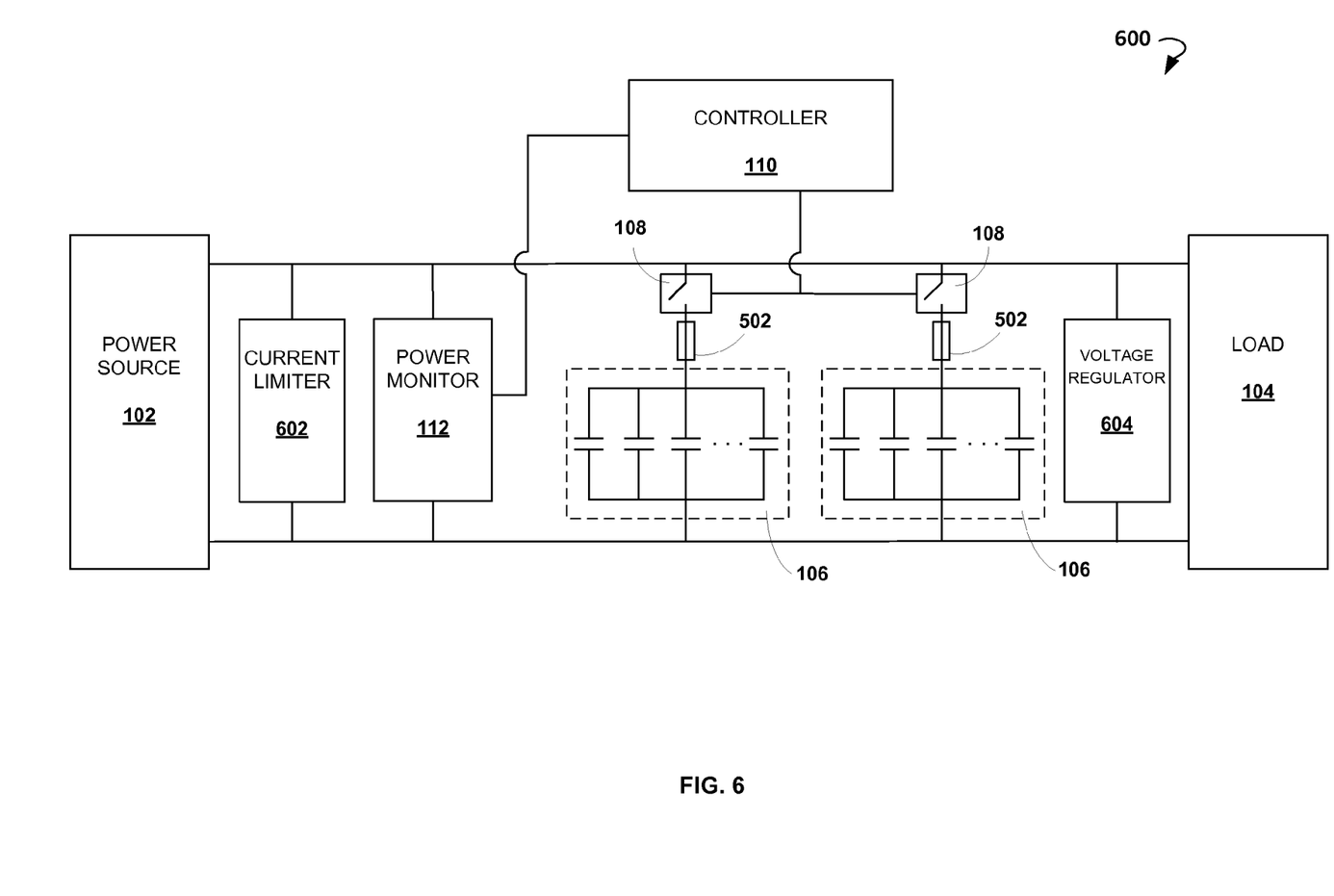
FIG. 6 is a block diagram illustrating an electronic system with a circuit for preventing power interruptions.

FIG. 6 illustrates yet another exemplary embodiment, electronic system 600, in which a circuit for preventing power interruptions is used. The electronic system 600 includes the power source 102, the load 104, the controller 110, the power monitor 112, the at least one capacitor array 106, the at least one switching element 108, and the at least one fuse 502. In the embodiment illustrated in FIG. 6, the electronic system 600 further includes a current limiter 602, which is communicatively coupled with the line between the power source 102 and the capacitor array 106. The current limiter 602 is a circuit imposing an upper limit on the current that can be delivered to the load 104, so as to protect the electronic environment from harmful overcurrent effects. The current limiter 602 may be of many suitable designs known to those skilled in the art, including transistor-based circuits, diode based circuits, and so forth.

The electronic system 600 may further include a voltage regulator 604, which is communicatively coupled with the line between the capacitor array 106 and the load 104. The voltage regulator 604 is configured to automatically maintain a substantially constant voltage level. The voltage regulator 604 may be of a simple "feed-forward" design or may include negative feedback control loops. It may use an electromechanical mechanism or electronic components. Depending on the specific implementation, the voltage regulator 604 may be used to regulate one or more AC or DC voltages.

The controller 110 may also selectively drive the switching elements 108 based on time parameters or parameters measured by the power monitor 112 (e.g. capacitance, current leakage, etc.). If one or more of these parameters becomes higher/lower than a predetermined level, the controller 110 may instruct switching elements 108 to activate one or more capacitor arrays 106. When the one or more capacitor arrays 106 are activated, they may supply power (discharge) to the load during voltage/energy drop events, thereby keeping the load in good operating condition. During periods of normal operation of the system, i.e. periods not having voltage/energy drop events, the capacitor arrays 106 may be recharged by the power source.

The circuits and techniques described above may provide the ability to automatically prevent power interruptions in the line between a power source and a load. In addition, they may provide the ability to extend the operating life of the power source by reducing the power drawn from the power source. The circuits may also eliminate the need for backup battery power in various applications, which in turn helps to reduce the battery disposal problem. Further, because the circuits allow selective activation of capacitor arrays, leaving the arrays not electrically coupled until activated, the normal degradation experienced by electrically coupled capacitors is avoided in circuits designed according to the present invention. Circuit designers can therefore utilize a reduced number of capacitors in their circuits, which will further reduce the problem of component disposal. The circuits may provide still further ecological benefits by replacing battery storage in alternative power generators, thereby advancing research in the development of energy resources.

The foregoing description is provided to enable a person skilled in the art to make or use specific embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments described herein but is to be accorded the widest scope consistent with the principles disclosed herein.

What is claimed is:

1. A circuit for providing power to a load, the circuit comprising:
    a power source;
    a power rail that couples the power source to a load;
    an array of capacitors arranged in parallel within the array, the array of capacitors communicatively coupled to the power rail;
    a switching element that selectively couples the array of capacitors to the power rail; and
    a controller operatively coupled to the switching element that operates the switching element based on predetermined criteria.

2. The circuit of claim 1, wherein the controller senses leakage current in at least one of the coupled capacitors and selectively triggers the switching element to isolate the capacitor based on a predetermined value of the leakage current.

3. The circuit of claim 1, wherein the controller comprises a timer that measures a designated time period and triggers the switching element when the time period expires.

4. The circuit of claim 1, further comprising at least one irreversible switching element deployed between the array of capacitors and the switching element.

5. The circuit of claim 1, further comprising a power monitor coupled to the controller, the power monitor measuring parameters at the power rail in real time.

6. The circuit of claim 5, wherein the controller selectively triggers the switching element in real time based on a value of a parameter measured by the power monitor.

7. The circuit of claim 6, wherein the controller triggers the switching element when a voltage characteristic of the power rail satisfies a predetermined condition.

8. The circuit of claim 1, further comprising a current limiter.

9. The circuit of claim 1, further comprising a voltage regulator.

10. The circuit of claim 6, wherein the parameter measured by the power monitor is any of voltage, current, capacitance, energy, or time.

11. The circuit of claim 5, wherein the parameter measured by the power monitor is any of voltage, current, capacitance, energy, or time.

12. The circuit of claim 1, further comprising a power monitor coupled to a controller, the power monitor determining capacitance at the power rail in real time.

* * * * *